US012637049B2

(12) United States Patent
Yeo

(10) Patent No.: US 12,637,049 B2
(45) Date of Patent: May 26, 2026

(54) PEDAL SIMULATOR AND VEHICLE BRAKE DEVICE INCLUDING THE SAME

(71) Applicant: HYUNDAI MOBIS CO., LTD., Seoul (KR)

(72) Inventor: Sang Won Yeo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 12 days.

(21) Appl. No.: 18/927,216

(22) Filed: Oct. 25, 2024

(65) Prior Publication Data

US 2025/0249876 A1    Aug. 7, 2025

(30) Foreign Application Priority Data

Feb. 6, 2024    (KR) ........................ 10-2024-0018174

(51) Int. Cl.
B60T 8/40          (2006.01)
B60T 7/04          (2006.01)
B60T 13/74         (2006.01)

(52) U.S. Cl.
CPC ................ B60T 8/409 (2013.01); B60T 7/04 (2013.01); B60T 13/745 (2013.01)

(58) Field of Classification Search
None
See application file for complete search history.

(56) References Cited

U.S. PATENT DOCUMENTS

| | | | |
|---|---|---|---|
| 8,157,333 B2 * | 4/2012 | Arakawa ............... | B60T 13/746 303/114.1 |
| 9,428,169 B2 * | 8/2016 | Zhang ................... | B60T 13/745 |
| 10,850,718 B2 * | 12/2020 | Goto ..................... | B60T 13/745 |
| 11,603,085 B2 * | 3/2023 | Yun ....................... | B60T 13/745 |
| 2024/0262334 A1 * | 8/2024 | Yun ....................... | B60T 13/745 |

FOREIGN PATENT DOCUMENTS

KR          10-2372394 B1      3/2022

* cited by examiner

*Primary Examiner* — Michael Quandt
(74) *Attorney, Agent, or Firm* — Morgan, Lewis & Bockius LLP

(57) ABSTRACT

A pedal simulator includes a damper housing unit, a damper holder unit coupled to the damper housing unit, a first bearing unit rotatably disposed on the damper holder unit, a damper piston unit slidably accommodated inside the damper housing unit, a damper unit coupled to the damper piston unit, accommodated inside the damper housing unit, and compressed by a movement of the damper piston unit, a damper pressing unit coupled to the damper piston unit to press the damper piston unit, and a first elastic unit disposed between the damper pressing unit and the damper housing unit to elastically support the damper pressing unit.

14 Claims, 7 Drawing Sheets

FIG. 5

PEDAL SIMULATOR AND VEHICLE BRAKE DEVICE INCLUDING THE SAME

CROSS-REFERENCE TO RELATED APPLICATION

This application claims priority from and the benefit under 35 USC § 119 of Korean Patent Application No. 10-2024-0018174, filed on Feb. 6, 2024, in the Korean Intellectual Property Office, the entire disclosure of which is incorporated by reference for all purposes.

BACKGROUND

Field

Exemplary embodiments of the present disclosure relate to a pedal simulator and a vehicle brake device including the same, and more particularly, to a pedal simulator capable of implementing regenerative braking and a vehicle brake device including the same.

Description of the Related Art

An electric brake system of a vehicle is a brake system that generates a braking force by using an electrically controlled electric caliper without a mechanical connection. Electric braking systems generally applied to electric vehicles implement regenerative braking.

In the related art, in order to implement regenerative braking in an electric braking system, a separate independent chamber such as a valve is provided to prevent a pedal force from being transmitted to a force generated by a motor so that a sense of difference of a pedal stepping force is removed in a regenerative braking section, thereby achieving structural separation.

In the case of electric vehicles, a regenerative braking force is generated when an accelerator pedal is released during driving, and there is a problem in that a large sense of difference is felt in a pedal stepping force corresponding to regenerative braking at the initial stage of stepping a brake pedal. Therefore, it is required to solve such a problem.

The background art of the present disclosure is disclosed in Korean Patent No. 10-2372394 (registered on Mar. 11, 2022 and entitled "Braking Device for Vehicle").

SUMMARY

The present disclosure has been made to solve the above problems, and an object of the present disclosure is to provide a pedal simulator capable of improving regenerative braking performance and implementing pedal feel and a vehicle brake device including the same.

Another object of the present disclosure is to provide a pedal simulator capable of improving a sense of difference of a pedal stepping force during regenerative braking and a vehicle brake device including the same.

In order to solve the above problems, a pedal simulator in accordance with the present disclosure includes: a damper housing unit; a damper holder unit coupled to the damper housing unit; a first bearing unit rotatably disposed on the damper holder unit; a damper piston unit slidably accommodated inside the damper housing unit; a damper unit coupled to the damper piston unit, accommodated inside the damper housing unit, and compressed by a movement of the damper piston unit; a damper pressing unit coupled to the damper piston unit to press the damper piston unit; and a first elastic unit disposed between the damper pressing unit and the damper housing unit to elastically support the damper pressing unit The damper housing unit may include: a damper housing body having one side to which the damper holder unit is coupled, and the damper piston unit and the damper unit may be disposed in the damper housing body; and a seating portion protruding from an inner peripheral surface of the damper housing body and extending along a circumferential direction of the damper housing body, the damper piston unit being seated on the seating portion by an elastic force of the first elastic unit.

The seating portion may include one or more step portions recessed in an outer surface of the seating portion such that the one or more step portions are in contact with the damper piston unit.

The step portion may be disposed along a circumferential direction of the seating portion.

The one or more step portions may include a plurality of step portions spaced apart from one another along the circumferential direction of the seating portion.

Each of the step portions may extend radially from a central portion of the seating portion.

Each of the step portions may have a cross-sectional shape of either a polygon or a semicircle.

The damper holder unit may include: a holder body coupled to the damper housing unit and to which the first bearing unit is rotatably coupled; and a holder protrusion protruding from an outer surface of the holder body.

The damper pressing unit may include: a push rod portion rotatably coupled to the damper piston unit; and a first seating portion axially coupled to the push rod portion, the first elastic unit being seated on the first seating portion.

A vehicle brake device in accordance with the present disclosure includes: a housing unit; a gear unit rotatably disposed in the housing unit and rotated by receiving a rotational force of a motor; a motion conversion unit disposed inside the housing unit and coupled to the gear unit to convert a rotational motion of the gear unit into a linear motion; a second elastic unit configured to elastically support the motion conversion unit inside the housing unit; a piston unit movably coupled to the motion conversion unit; a master cylinder unit coupled to one side of the housing unit and configured to form hydraulic pressure by an insertion of the piston unit; a second bearing unit disposed inside the housing unit to rotatably support the gear unit; and the pedal simulator movably disposed on the other side of the housing unit and coupled to the motion conversion unit.

The motion conversion unit may include: a screw bolt part slidably coupled to the gear unit and rotated together with the gear unit; and a nut part coupled to the screw bolt part and moved along the screw bolt part.

The piston unit may be coupled to the nut part and moved together with the nut part.

The second elastic unit may elastically support the nut part.

The nut part may include: a nut body helically coupled to the screw bolt part; a second seating portion protruding from an outer peripheral surface of the nut body, the second elastic unit being seated on the second seating portion; and a rotation prevention portion disposed on the nut body to restrict a rotation of the nut body.

The rotation prevention portion may include a protrusion protruding from an outer peripheral surface of the second seating portion and contacting an inner surface of the housing unit.

The screw bolt part may include: a bolt body axially coupled to an inner side of the gear unit to be slidably movable and formed in a hollow prismatic shape; and a screw shaft disposed on one end of the bolt body and helically coupled to the nut body, the bolt body being moved linearly along the screw shaft.

The present disclosure has the effect of improving regenerative braking performance and increasing the amount of regenerative braking.

In addition, the present disclosure has the effect of minimizing the addition of parts and implementing pedal feel without increasing a layout.

In addition, the present disclosure has the effect of improving a sense of difference of a pedal stepping force during regenerative braking.

BRIEF DESCRIPTION OF THE DRAWINGS

FIG. 5 is an exploded perspective view and a partially enlarged plan view of FIG. 4.

DETAILED DESCRIPTION

Figure 1:
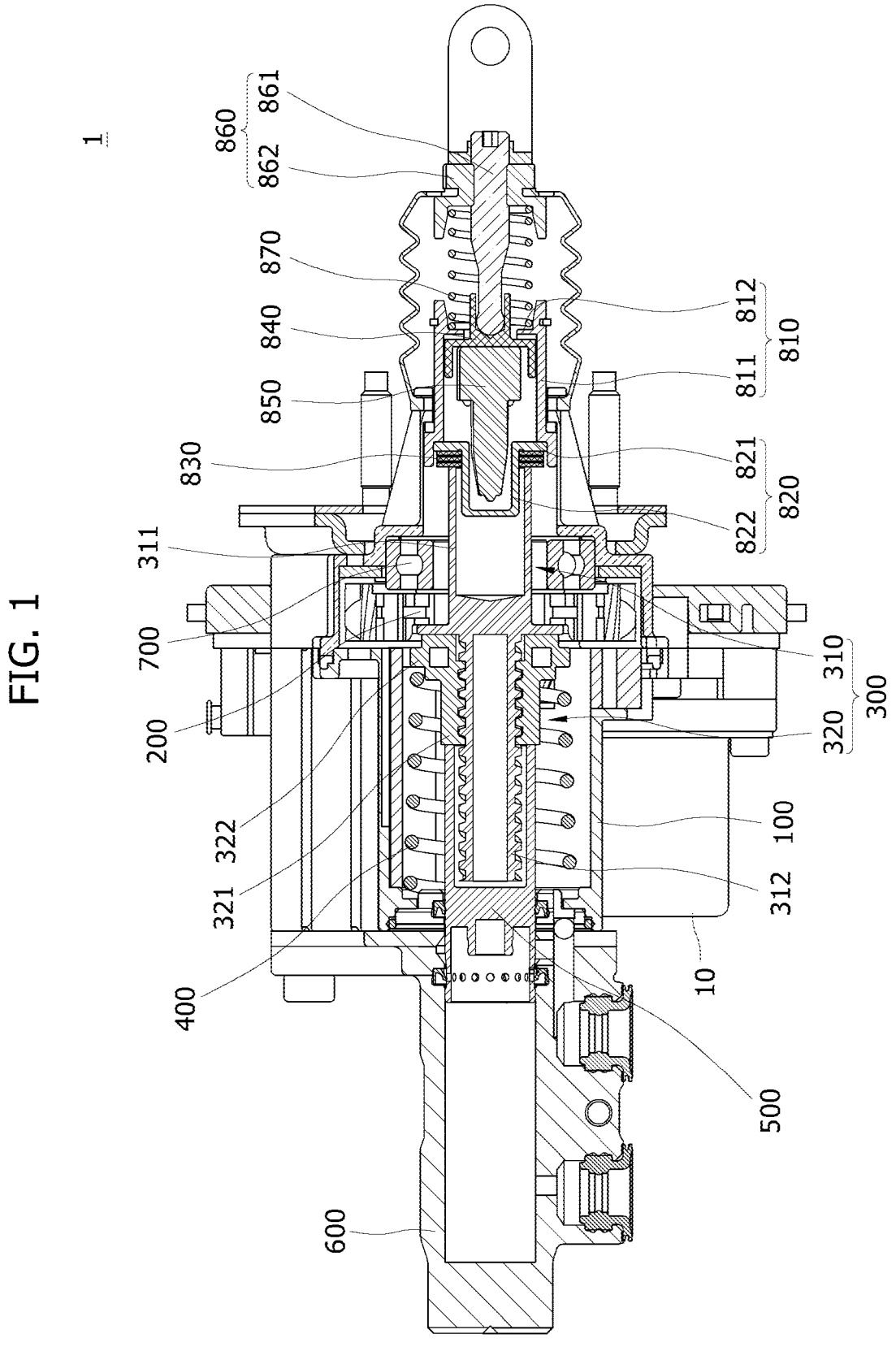
FIG. 1 is a cross-sectional view illustrating a vehicle brake device in accordance with the embodiment of the present disclosure.

Hereinafter, a pedal simulator and a vehicle brake device including the same in accordance with the present disclosure are described with reference to the accompanying drawings. In this process, the thicknesses of lines or the sizes of elements illustrated in the drawings may be exaggerated for the purpose of clarity and convenience of explanation. In addition, terms to be described below are terms defined in consideration of functions thereof in the present disclosure and may be changed according to the intention of a user or an operator, or practice. Accordingly, such terms should be defined based on the disclosure over the present specification.

Figure 2:
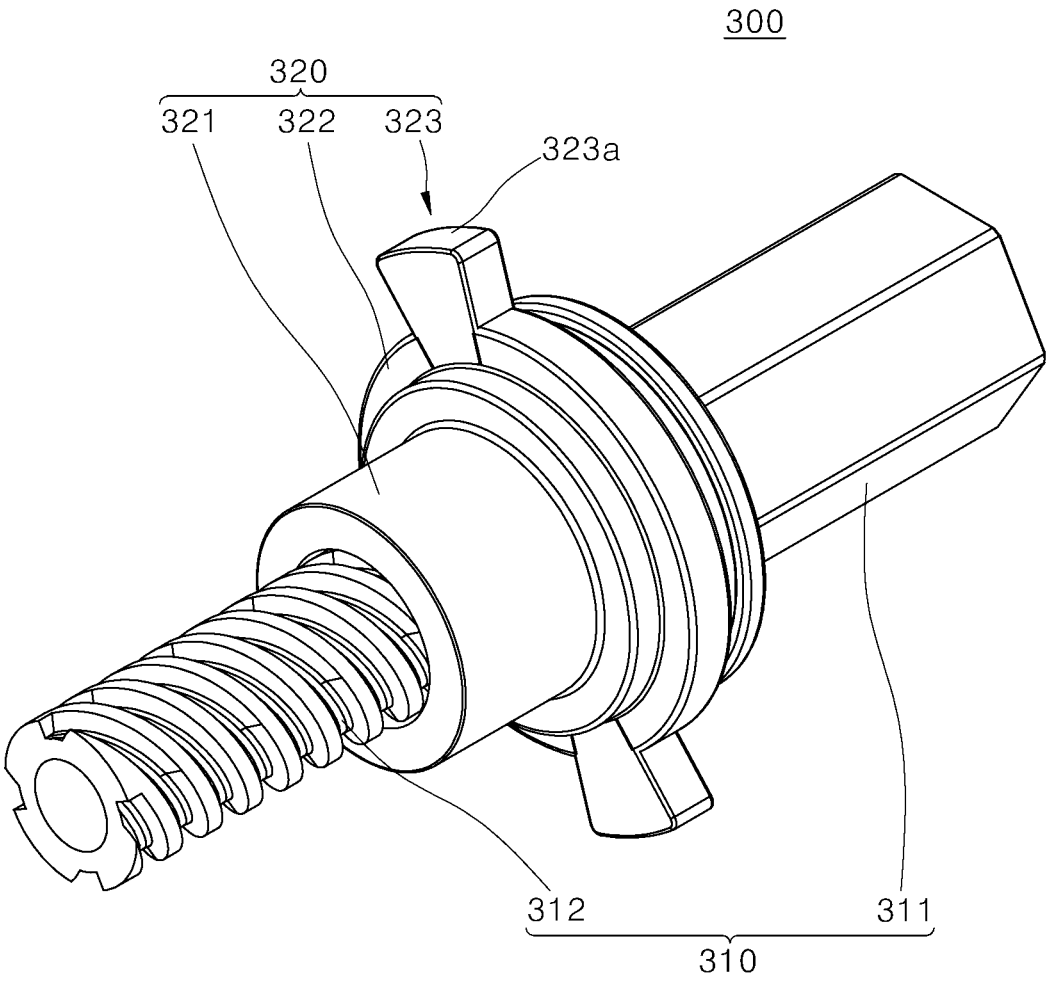
FIG. 2 is a perspective view illustrating a motion conversion unit in the vehicle brake device in accordance with the embodiment of the present disclosure.
Figure 3:
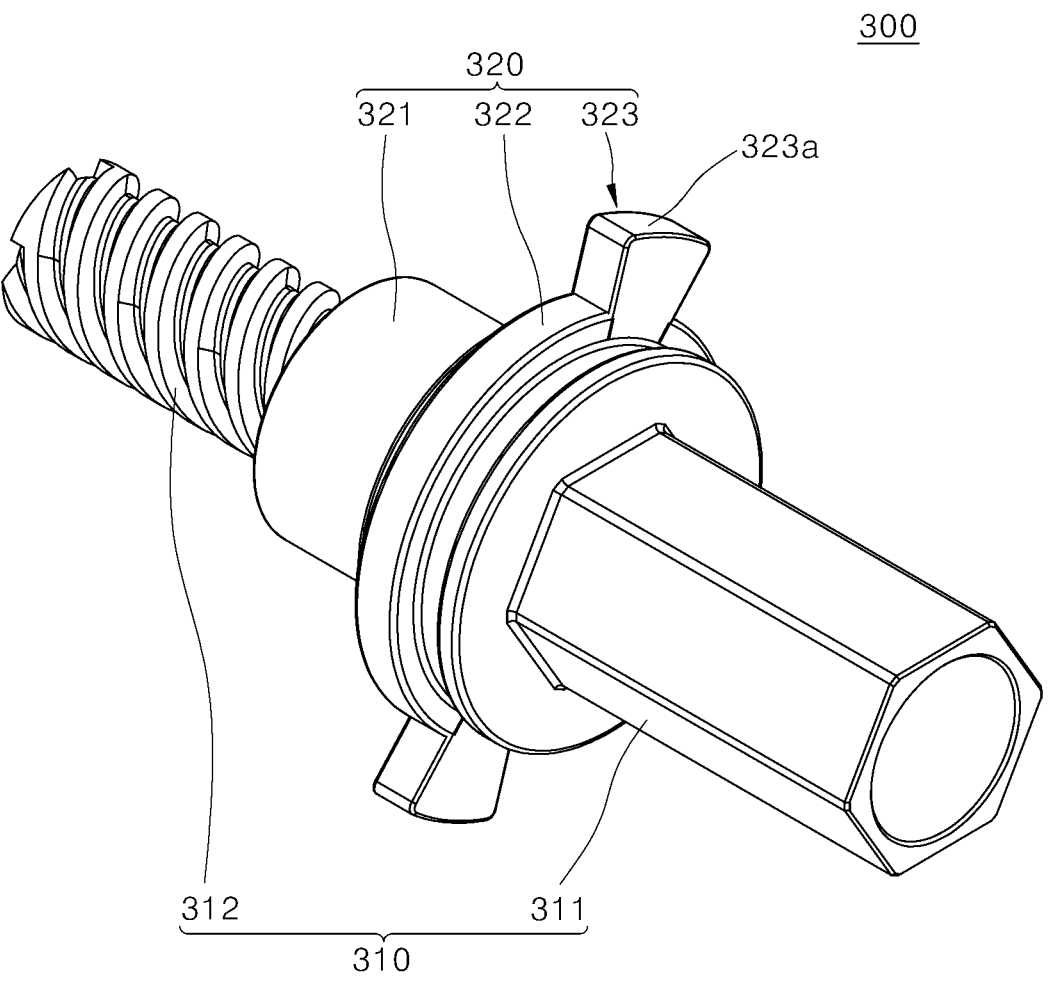
FIG. 3 is a perspective view of the motion conversion unit in FIG. 2 when viewed in another direction.

FIG. 1 is a cross-sectional view illustrating a vehicle brake device in accordance with the embodiment of the present disclosure, FIG. 2 is a perspective view illustrating a motion conversion unit in the vehicle brake device in accordance with the embodiment of the present disclosure, and FIG. 3 is a perspective view of the motion conversion unit in FIG. 2 when viewed in another direction.

Referring to FIGS. 1 to 3, a vehicle brake device 1 in accordance with the embodiment of the present disclosure includes a housing unit 100, a gear unit 200, a motion conversion unit 300, a second elastic unit 400, a piston unit 500, a master cylinder unit 600, a second bearing unit 700, and a pedal simulator 800, which are described in detail as follows.

The housing unit 100 may be formed in a hollow shape with an internal space, and a motor 10 may be provided on the outside of the housing unit 100.

The gear unit 200 may be rotatably disposed in the housing unit 100. The gear unit 200 may be located inside the housing unit 100 or may be disposed on one side of the housing unit 100 and rotatably coupled to the housing unit 100.

The gear unit 200 may be connected to the motor 10 located on the outside of the housing unit 100, and may be rotated by receiving the rotational force of the motor 10. The gear unit 200 may be formed in a hollow shape in which a central portion is penetrated.

The motion conversion unit 300 may be installed inside the housing unit 100 and coupled to the gear unit 200. The motion conversion unit 300 converts the rotational motion of the gear unit 200 into linear motion, and may include a screw bolt part 310 and a nut part 320.

As an embodiment of the motion conversion unit 300, the screw bolt part 310 may be coupled to the gear unit 200 and rotated together with the gear unit 200, and the nut part 320 may be coupled to the screw bolt part 310 and moved linearly along the screw bolt part 310.

As another embodiment of the motion conversion unit 300, the nut part 320 may be coupled to the gear unit 200 and rotated together with the gear unit 200, and the screw bolt part 310 coupled to the nut part 320 may be moved linearly in an axial direction by rotation of the nut part 320. In such a case, the piston unit 500 to be described below may be coupled to the screw bolt part 310 that is moved linearly.

The following describes an embodiment in which in the motion conversion unit 300 of the vehicle brake device 1 in accordance with the present disclosure, the nut part 320 coupled to the screw bolt part 310 moves linearly along the screw bolt part 310.

The screw bolt part 310 may be installed inside the housing unit 100. The screw bolt part 310 may be movably accommodated in the housing unit 100. The screw bolt part 310 may be disposed in a longitudinal direction of the housing unit 100.

The screw bolt part 310 may be slidably coupled to the gear unit 200. Additionally, the screw bolt part 310 may penetrate the center of the gear unit 200 to be slidably coupled to the inside of the gear unit 200, and may linearly reciprocate in the longitudinal direction of the housing unit 100.

The screw bolt part 310 may rotate together with the gear unit 200 in the same direction as the rotation direction of the gear unit 200. The screw bolt part 310 may include a bolt body 311 and a screw shaft 312.

The bolt body 311 may be axially coupled to the gear unit 200 by penetrating the center of the gear unit 200, and may be slidably moved inside the gear unit 200. The bolt body 311 may be formed in a prismatic shape. Additionally, the cross-section of the bolt body 311 may be formed in a polygonal shape with angled corners.

An inner diameter of the gear unit 200 may be formed to be the same as the outer diameter of the bolt body 311 so that the gear unit 200 that rotates and the bolt body 311 are engaged with each other. The bolt body 311 may be formed in a hollow shape with one end open.

A damper holder unit 820 of the pedal simulator 800 to be described below may be inserted into the bolt body 311, so that the damper holder unit 820 may be accommodated in the bolt body 311.

The screw shaft 312 may be located at one end of the bolt body 311. The screw shaft 312 may be integrally provided with the bolt body 311. The screw shaft 312 and the bolt body 311 may be disposed on the same axial line. The screw shaft 312 may axially rotate in the same direction as the rotation direction of the bolt body 311 rotated by the rotation of the gear unit 200.

On an outer surface of the screw shaft 312, threads may be formed along an outer diameter thereof. The nut part 320 may be helically coupled to the screw shaft 312, and the nut part 320 may linearly reciprocate in the axial direction of the screw shaft 312 according to the rotation direction of the screw shaft 312.

The nut part 320 may be coupled to the screw bolt part 310 and moved along the screw bolt part 310. The nut part 320 may include a nut body 321, a second seating portion 322, and a rotation prevention portion 323.

The nut body 321 may be helically coupled to the screw shaft 312. Threads may be formed on an inner surface of the nut body 321 along an inner diameter thereof.

The second seating portion 322 may protrude from an outer peripheral surface of the nut body 321. The second seating portion 322 may be formed along a circumferential direction of the nut body 321. The second elastic unit 400 to be described below may be seated on the second seating portion 322 in a state in which one side of the second elastic unit 400 is in contact with an outer surface of the second seating portion 322. Additionally, one side of the second elastic unit 400 may be supported by the second seating portion 322.

The rotation prevention portion 323 may be provided on the second seating portion 322. The rotation prevention portion 323 may restrict the rotation of the nut body 321 so that the nut body 321 moved along the screw axis 312 is not rotated together with the screw axis 312. The rotation prevention portion 323 may include a protrusion 323a.

The protrusion 323a may protrude from an outer peripheral surface of the second seating portion 322. A plurality of protrusions 323a may be disposed to be spaced apart from one another along a circumferential direction of the second seating portion 322. The protrusion 323a may contact the inner surface of the housing unit 100. Additionally, the housing unit 100 may include a guide part (not illustrated) that guides the linear movement of the nut part 320.

The guide part may be recessed in the inner surface of the housing unit 100. The guide part may be formed in the longitudinal direction of the housing unit 100. The protrusion 323a is located inside the guide part and moves along the guide part, so that the nut body 321 may be moved linearly without being rotated.

The second elastic unit 400 may elastically support the motion conversion unit 300 inside the housing unit 100. Additionally, the second elastic unit 400 may elastically support the nut part 320. The second elastic unit 400 may have one side in contact with the inner surface of the housing part 100 and the other side in contact with an outer surface of the nut part 320, and provide an elastic force to the screw bolt part 310 to which the nut part 320 is coupled.

The second elastic unit 400 may be compressed by the nut part 320 moved linearly along the screw axis 312, or may be compressed by the screw bolt part 310 that slides and moves linearly on the gear unit 200.

The compressed second elastic unit 400 may provide an elastic force (elastic restoring force) to the screw bolt part 310 to return the screw bolt part 310 to its original position. The second elastic unit 400 may include a coil spring surrounding the outer side of the piston unit 500.

The piston unit 500 may be coupled to the nut part 320. Additionally, a rod portion of the piston unit 500 may be coupled to surround the outer side of the nut body 321. The piston unit 500 may move linearly together with the nut part 320 in cooperation with the nut part 320.

A head portion of the piston unit 500 may be inserted into the master cylinder unit 600, which is described below, provided on one side of the housing unit 100.

The master cylinder unit 600 may be coupled to one side of the housing unit 100. In another embodiment, the master cylinder unit 600 may be integrally provided with the housing unit 100. The master cylinder unit 600 may be formed in a hollow shape.

An interior of the housing unit 100 and an interior of the master cylinder unit 600 may be in communication. The piston unit 500 may be inserted into the master cylinder unit 600. The master cylinder unit 600 may generate braking hydraulic pressure by pressing of the piston unit 500.

The second bearing unit 700 may be installed inside the housing unit 100 to rotatably support the gear unit 200. An outer ring of the second bearing unit 700 may be in contact with the inner surface of the housing unit 100, and an inner ring thereof may be in contact with an outer surface of the gear unit 200.

Figure 4:
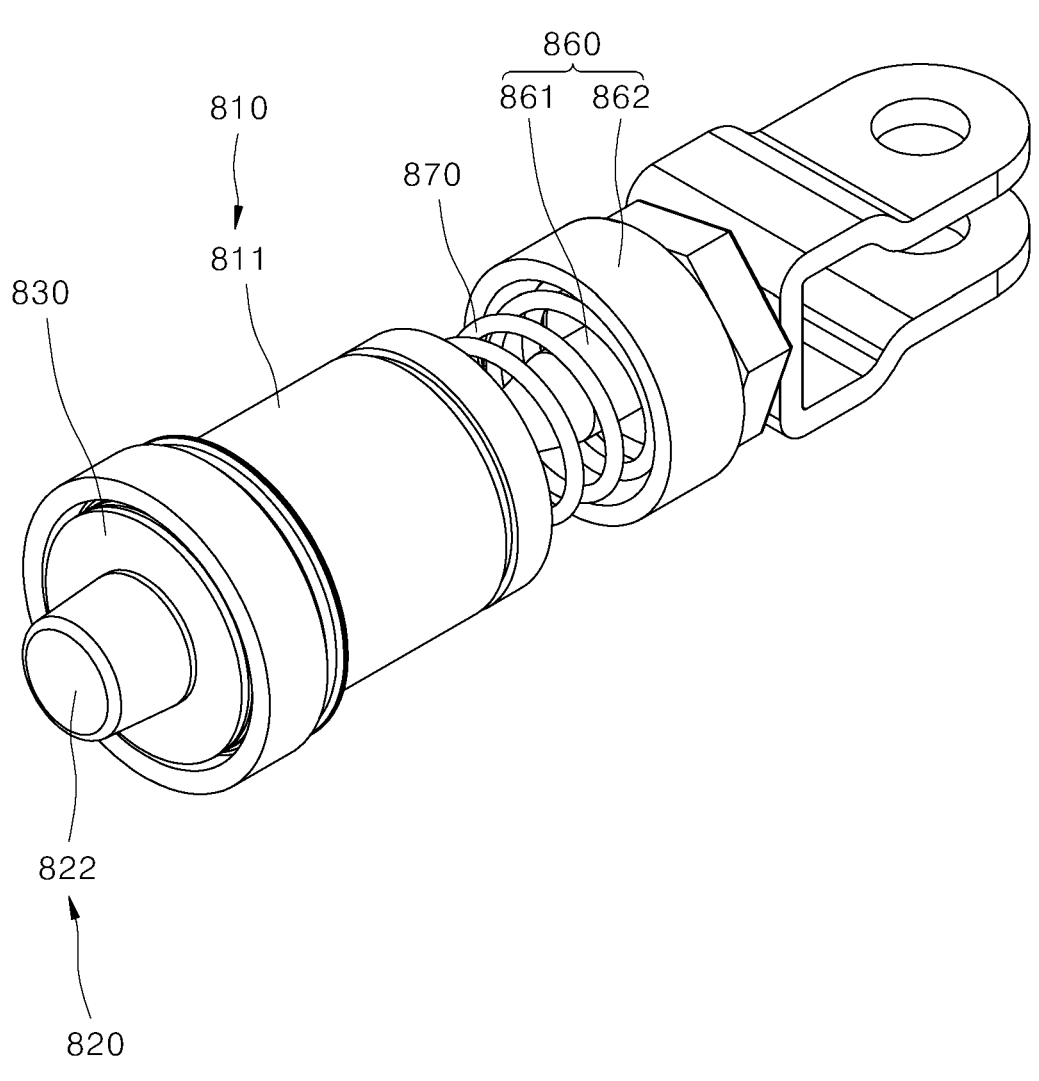
FIG. 4 is a perspective view illustrating a pedal simulator in accordance with the embodiment of the present disclosure.
Figure 5:
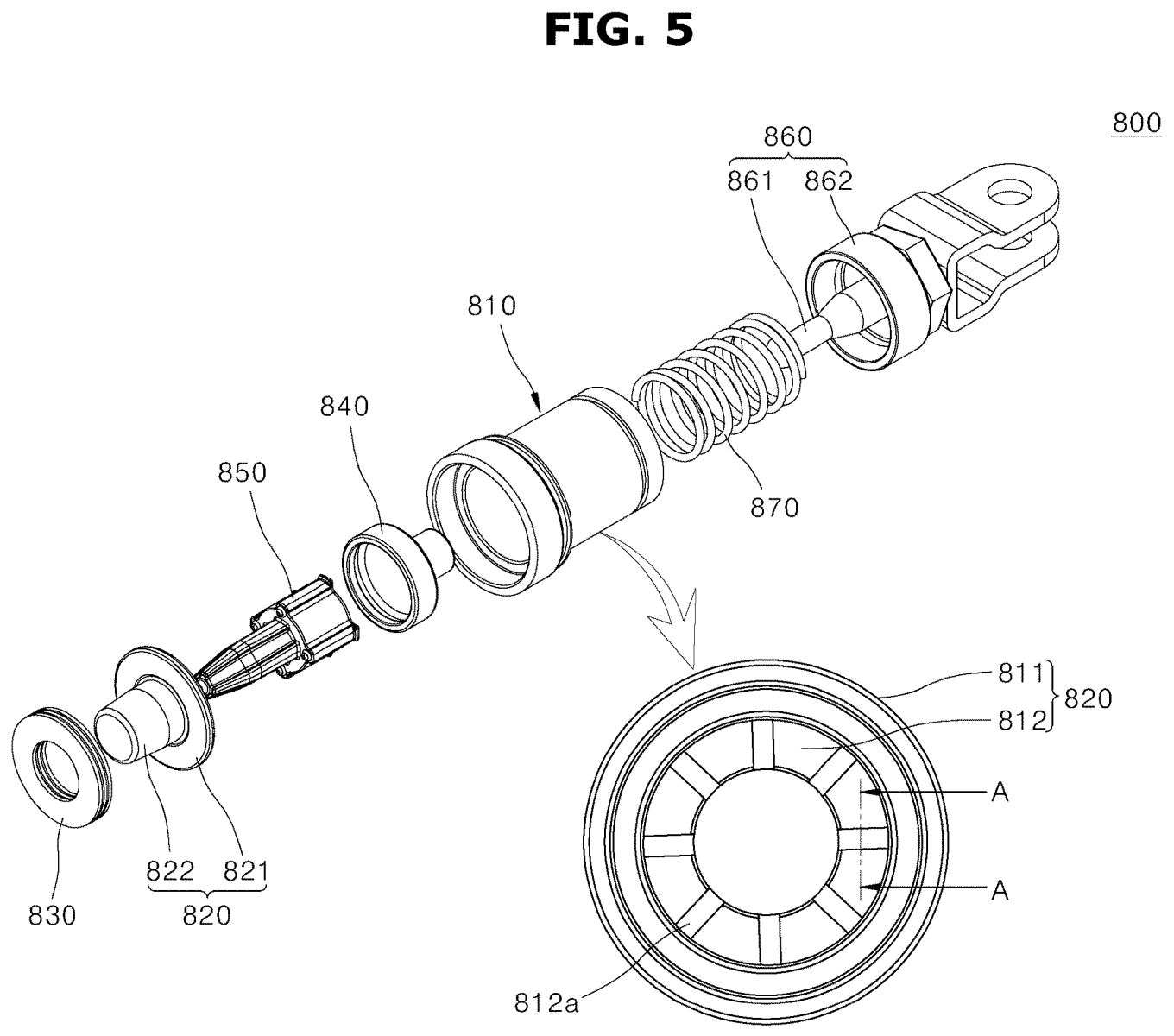
Figure 6:
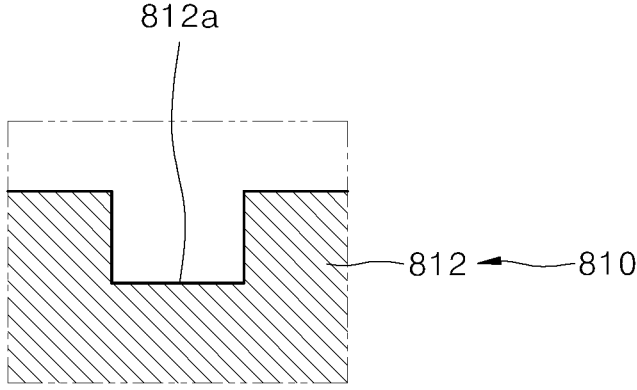
FIGS. 6 to 8 are cross-sectional views taken along line A-A in FIG. 5.
Figure 7:
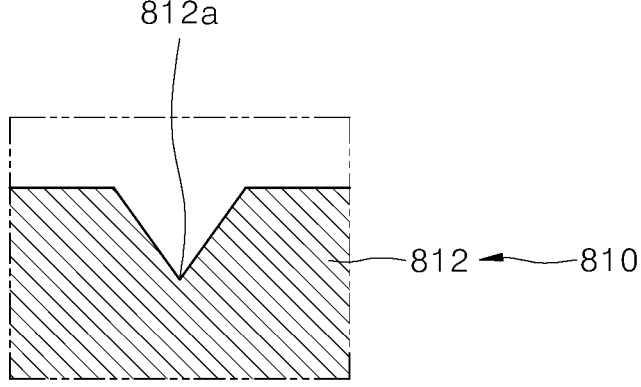
Figure 8:
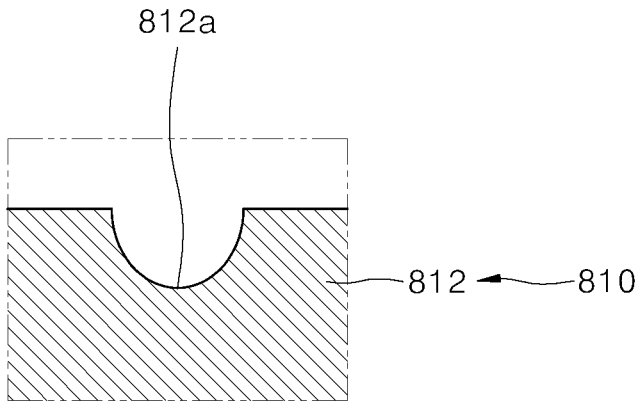

FIG. 4 is a perspective view illustrating the pedal simulator in accordance with the embodiment of the present disclosure, FIG. 5 is an exploded perspective view and a partially enlarged plan view of FIG. 4, and FIGS. 6 to 8 are cross-sectional views taken along line A-A in FIG. 5.

Referring to FIGS. 1 to 8, the pedal simulator 800 in accordance with the embodiment of the present disclosure may be slidably disposed on the other side of the housing unit 100. The screw bolt part 310 may be rotatably coupled to the pedal simulator 800.

The pedal simulator 800 may include a damper housing unit 810, the damper holder unit 820, a first bearing unit 830, a damper piston unit 840, a damper unit 850, a damper pressing unit 860, and a first elastic unit 870.

The damper housing unit 810 may be slidably disposed on the housing unit 100. The damper housing unit 810 may have a hollow shape and may be formed in a shape with both sides open.

The inside of the damper housing unit 810 may be filled with a lubricant such as grease or brake fluid. The damper housing unit 810 may include a damper housing body 811 and a seating portion 812.

The damper housing body 811 has one side (left side in FIG. 2) to which the damper holder unit 820 to be described below is coupled, and may accommodate the damper piston unit 840 and the damper unit 850 to be described below therein.

The seating portion 812 may be provided on the other side of the damper housing body 811 and protrude from an inner peripheral surface of the damper housing body 811. The seating portion 812 may be formed along a circumferential direction of the damper housing body 811. The seating portion 812 may be formed in a hollow shape in which a central portion is penetrated.

The damper piston unit 840 may be seated on the seating portion 812 by an elastic force (elastic restoring force) of the first elastic unit 870 to be described below.

The seating portion 812 may be provided with one or more step portions 812a. The step portion 812a may be recessed in an outer surface of the seating portion 812 such that step portion 812a may be in contact with the damper piston unit 840. By forming the step portion 812a in the seating portion 812, a contact area between the damper piston unit 840 and the seating portion 812 can be minimized.

The step portion 812a may be formed along a circumferential direction of the seating portion 812. Additionally, the step portion 812a may be formed along the circumferential direction of the damper housing body 811.

A plurality of step portions 812a may be disposed to be spaced apart from one another along the circumferential direction of the seating portion 812. Additionally, the plurality of step portions 812a may be disposed to be spaced apart from one another along the circumferential direction of the damper housing body 811.

The plurality of step portions 812a may be radially disposed based on a central portion of the seating portion 812. Additionally, the step portion 812a may be radially disposed based on a central portion of the damper housing body 811.

The step portion 812a may be formed to have a cross-sectional shape of either a polygon with angled corners such as a triangle or a square, or a rounded semicircle.

When the damper piston unit 840 is separated from the seating portion 812 by pressing of the damper pressing unit 860 to be described below in a state in which the damper piston unit 840 is seated on the seating portion 812, resistance occurs at a contact surface between the damper piston unit 840 and the seating portion 812 due to the viscosity and surface tension of the lubricant. Due to the viscosity and surface tension of the lubricant, a sense of difference and noise may occur during the initial operation of the pedal simulator 800.

Due to the formation of the step portion 812a in the seating portion 812, the contact area between the damper piston unit 840 and the seating portion 812 can be minimized, thereby reducing the influence of the viscosity and surface tension of the lubricant.

The damper holder unit 820 may be coupled to the damper housing unit 810. Additionally, the damper holder unit 820 may be coupled to one side of the damper housing body 811. The damper holder unit 820 may rotatably support the bolt body 311. The damper holder unit 820 may include a holder body 821 and a holder protrusion 822.

The holder body 821 may be formed in a hollow shape with one end open. The holder body 821 may be coupled to the damper housing body 811 of the damper housing unit 810 and moved together with the damper housing unit 810.

The holder protrusion 822 may be provided on the holder body 821. The holder protrusion 822 may protrude from an outer surface of the holder body 821 and formed in a hollow shape.

The holder body 821 and the holder protrusion 822 may be in communication. A part of the damper unit 850 may be accommodated inside the holder protrusion 822. A diameter of the holder protrusion 822 may be formed to be smaller than a diameter of the holder body 821. The holder protrusion 822 may be inserted into the bolt body 311.

The first bearing unit 830 may be provided on the damper holder unit 820. The first bearing unit 830 may be coupled to an outer surface of the damper holder unit 820 facing the screw bolt part 310. Additionally, the first bearing unit 830 may be rotatably coupled to the outer surface of the holder body 821 to surround the outer circumference of the holder protrusion 822.

One end of the bolt body 311 may be seated on the first bearing unit 830. The first bearing unit 830 may rotatably support the bolt body 311. The first bearing unit 830 may support the axial load of the screw bolt part 310.

The damper piston unit 840 may be slidably disposed in the damper housing unit 810. Additionally, the damper piston unit 840 may be movably accommodated inside the damper housing body 811. The damper piston unit 840 may be moved by the pressing of the damper pressing unit 860 to be separated from the seating portion 812, and may be moved by the elastic force of the first elastic unit 870 and seated on the seating portion 812.

The damper unit 850 may be coupled to the damper piston unit 840. The damper unit 850 may be partially accommodated inside the holder protrusion 822, and may be compressed within the holder protrusion 822 by the movement of the damper piston unit 840.

The damper unit 850 may be manufactured including an elastically deformable material. The damper unit 850 may include rubber, silicon, plastic, or the like as an elastically deformable material.

The damper pressing unit 860 may be coupled to the damper piston unit 840 to press the damper piston unit 840. The damper pressing unit 860 may include a push rod portion 861 and a first seating portion 862.

The push rod portion 861 may be rotatably coupled to an outer surface of the damper piston unit 840 in a joint manner. In addition, the push rod portion 861 may be caulked to the damper piston unit 840.

The first seating portion 862 is axially coupled to the push rod portion 861. Additionally, the push rod portion 861 may be coupled to the first seating portion 862 by penetrating the center of the first seating portion 862. The first elastic unit 870 may be seated on the first seating portion 862.

The first elastic unit 870 may be installed between the damper pressing unit 860 and the damper housing unit 810 to elastically support the damper pressing unit 860. One side of the first elastic unit 870 may be in contact with an outer surface of the first seating portion 862, the other side of the first elastic unit 870 may be in contact with the other side of the damper housing unit 810, and the first elastic unit 870 may provide an elastic force to the damper pressing unit 860 moved by an external force applied to the damper pressing unit 860.

The first elastic unit 870 may be compressed by the first seating portion 862 moved by the external force applied to the damper pressing unit 860. The compressed first elastic unit 870 may provide an elastic force (elastic restoring force) to the first seating portion 862 to return the first seating portion 862 to its original position. The first elastic unit 870 may be a coil spring surrounding the outer side of the push rod portion 861.

The operating process of the vehicle brake device in accordance with the embodiment of the present disclosure having the above-described configuration is described as follows.

Figure 9:
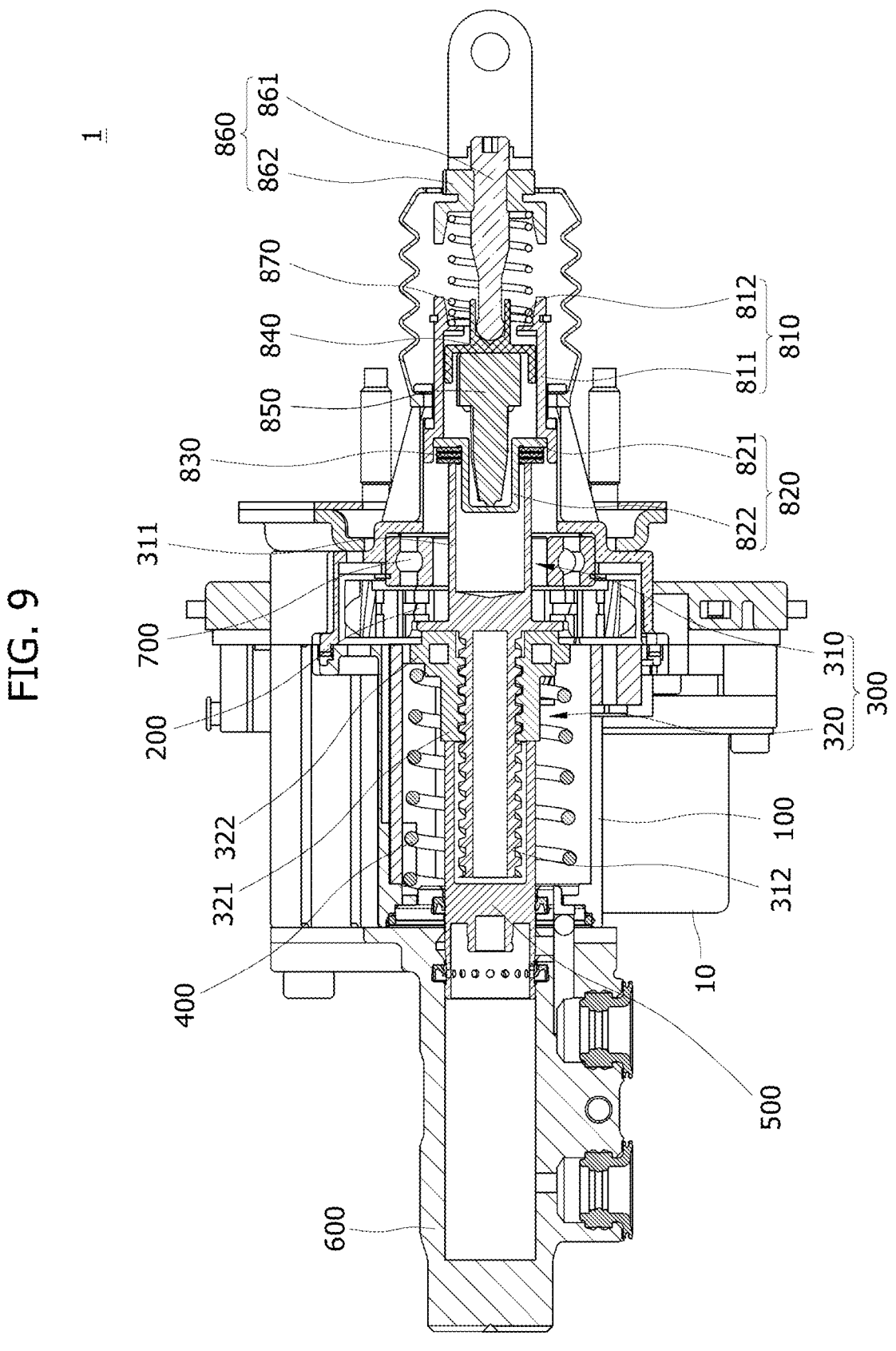
FIG. 9 is a cross-sectional view illustrating an operating state of the vehicle brake device in accordance with the embodiment of the present disclosure.

FIG. 9 is a cross-sectional view illustrating an operating state of the vehicle brake device in accordance with the embodiment of the present disclosure.

Referring to FIG. 9, in a deceleration section of the vehicle, the pedal simulator 800 becomes unable to move due to the elastic force of the second elastic unit 400 and the hydraulic reaction force. In such a case, the damper unit 850 may be compressed by the pressing of the damper pressing unit 860.

When the motor 10 is operated by a braking signal from a vehicle control unit (not illustrated), which is generated when a user steps on the pedal, and rotates the gear unit 200, the gear unit 200 rotates the bolt body 311.

By the rotation of the bolt body 311, the nut part 320 moves along the screw axis 312 (left direction based on FIG. 9), and braking hydraulic pressure is formed in the master cylinder unit 600 by the piston unit 500 coupled to the nut body 321. In such a case, the second elastic unit 400 is compressed by the movement of the nut part 320.

The screw bolt part 310 is not moved by the hydraulic reaction force applied to the screw bolt part 310 through the piston unit 500 due to the movement of the nut part 320 and the elastic force of the compressed second elastic unit 400, so that the position of the screw bolt part 310 is fixed.

The position of the screw bolt part 310 is fixed, so that the position of the pedal simulator 800 is also fixed. Additionally, the damper housing unit 810 becomes unable to move due to the elastic force of the second elastic unit 400 and the hydraulic reaction force.

When the damper pressing unit 860 is pressed by an external force, the damper pressing unit 860 moves toward the damper holder unit 820. As the damper pressing unit 860 moves, the first elastic unit 870 is compressed and deformed by the pressing of the first seating portion 862.

When an external force is applied to the damper pressing unit 860 and the push rod portion 861 presses the damper piston unit 840 seated on the seating portion 812, the damper piston unit 840 moves inward the damper holder unit 820 to compress the damper unit 850. In such a case, a user may feel an initial braking feeling.

The pedal simulator 800 and the vehicle brake device 1 including the same in accordance with the embodiment of the present disclosure can improve regenerative braking performance and increase the amount of regenerative braking.

The pedal simulator 800 and the vehicle brake device 1 including the same in accordance with the embodiment of the present disclosure can minimize the addition of parts and implement pedal feel without increasing a layout.

The pedal simulator 800 and the vehicle brake device 1 including the same in accordance with the embodiment of the present disclosure can improve a sense of difference of a pedal stepping force during regenerative braking.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. A pedal simulator comprising:
a first damper housing;
a second damper housing coupled to the first damper housing;
a first bearing unit rotatably disposed on the second damper housing;
a damper piston unit slidably accommodated inside the first damper housing;
a damper coupled to the damper piston unit, accommodated inside the first damper housing, and compressed by a movement of the damper piston unit;
a damper pressing rod coupled to the damper piston unit to press the damper piston unit; and
a first elastic unit disposed between the damper pressing rod and the first damper housing to elastically support the damper pressing rod,
wherein the first damper housing comprises:
a damper housing body having one side to which the second damper housing is coupled, wherein the damper piston unit and the damper are disposed in the damper housing body; and a seating portion protruding from an inner peripheral surface of the damper housing body and extending along a circumferential direction of the damper housing body, the damper piston unit being seated on the seating portion by an elastic force of the first elastic unit,
wherein the seating portion includes one or more step portions recessed in an outer surface of the seating portion.

2. The pedal simulator according to claim 1, wherein the step portion is disposed along a circumferential direction of the seating portion.

3. The pedal simulator according to claim 2, wherein the one or more step portions comprise a plurality of step portions spaced apart from one another along the circumferential direction of the seating portion.

4. The pedal simulator according to claim 3, wherein each of the step portions extends radially from a central portion of the seating portion.

5. The pedal simulator according to claim 4, wherein each of the step portions has a cross-sectional shape of either a polygon or a semicircle.

6. The pedal simulator according to claim 1, wherein the second damper housing comprises:
a holder body coupled to the first damper housing and to which the first bearing unit is rotatably coupled; and
a holder protrusion protruding from an outer surface of the holder body.

7. The pedal simulator according to claim 1, wherein the damper pressing rod comprises:
a push rod portion rotatably coupled to the damper piston unit; and
a first seating portion axially coupled to the push rod portion, the first elastic unit being seated on the first seating portion.

8. A vehicle brake device comprising:
a housing;
a gear unit rotatably disposed in the housing and rotated by receiving a rotational force of a motor;
a motion conversion unit disposed inside the housing and coupled to the gear unit to convert a rotational motion of the gear unit into a linear motion;
a second elastic unit configured to elastically support the motion conversion unit inside the housing;
a piston unit movably coupled to the motion conversion unit;
a master cylinder coupled to one side of the housing and configured to generate hydraulic pressure in response to movement of the piston unit;
a second bearing unit disposed inside the housing to rotatably support the gear unit; and
the pedal simulator according to claim 1, the pedal simulator being movably disposed on the other side of the housing and coupled to the motion conversion unit.

9. The vehicle brake device according to claim 8, wherein the motion conversion unit comprises:
a screw bolt part slidably coupled to the gear unit and rotated together with the gear unit; and
a nut part coupled to the screw bolt part and moved along the screw bolt part.

10. The vehicle brake device according to claim 9, wherein the piston unit is coupled to the nut part and moved together with the nut part.

11. The vehicle brake device according to claim 9, wherein the second elastic unit elastically supports the nut part.

12. The vehicle brake device according to claim 11, wherein the nut part comprises:

a nut body helically coupled to the screw bolt part;

a second seating portion protruding from an outer peripheral surface of the nut body, the second elastic unit being seated on the second seating portion; and a rotation prevention portion formed to protrude from an outer peripheral surface of the second seating portion and configured to restrict a rotation of the nut body.

13. The vehicle brake device according to claim 12, wherein the rotation prevention portion comprises:

a protrusion protruding from an outer peripheral surface of the second seating portion and contacting an inner surface of the housing.

14. The vehicle brake device according to claim 12, wherein the screw bolt part comprises:

a bolt body axially coupled to an inner side of the gear unit, the bolt body being slidably movable and having a hollow prismatic shape; and a screw shaft disposed on one end of the bolt body and helically coupled to the nut body, the bolt body being moved linearly along the screw shaft.

\*  \*  \*  \*  \*